(12) United States Patent
Sawasaki (10) Patent No.: US 10,754,183 B2
(45) Date of Patent: Aug. 25, 2020

(54) DISPLAY DEVICE

(71) Applicant: SHARP KABUSHIKI KAISHA, Sakai, Osaka (JP)

(72) Inventor: Manabu Sawasaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 116 days.

(21) Appl. No.: 16/234,366

(22) Filed: Dec. 27, 2018

(65) Prior Publication Data

US 2019/0219861 A1   Jul. 18, 2019

(30) Foreign Application Priority Data

Jan. 15, 2018   (JP) .................... 2018-004158

(51) Int. Cl.
*G02F 1/01* (2006.01)
*G02F 1/1333* (2006.01)
*G02F 1/13363* (2006.01)
*G02F 1/1335* (2006.01)

(52) U.S. Cl.
CPC .... *G02F 1/133308* (2013.01); *G02F 1/13363* (2013.01); *G02F 1/133512* (2013.01); *G02F 1/133528* (2013.01); *G02F 2001/133331* (2013.01); *G02F 2001/133334* (2013.01); *G02F 2202/28* (2013.01)

(58) Field of Classification Search
CPC ......... G02F 1/133308; G02F 1/133512; G02F 1/133528; G02F 1/13363; G02F 2202/28; G02F 2001/133331; G02F 2001/133334; G02F 1/1333; G02B 5/3083; G02B 6/272; G02B 6/2746; G02B 27/281; G02B 27/283
USPC ...................................... 359/489.2
See application file for complete search history.

(56) References Cited

U.S. PATENT DOCUMENTS

2019/0129232 A1*   5/2019   Itagaki .............. G02F 1/133308

FOREIGN PATENT DOCUMENTS

JP   2014-213488 A   11/2014

* cited by examiner

*Primary Examiner* — William R Alexander
*Assistant Examiner* — Henry A Duong
(74) *Attorney, Agent, or Firm* — ScienBiziP, P.C.

(57) ABSTRACT

A display device includes a display panel configured to display an image, a phase difference function-provided polarizing plate attached to the display panel, a protection panel disposed to interpose the phase difference function-provided polarizing plate between the display panel and the protection panel, a structural element projecting from a plate surface of the protection pane that is opposite the phase difference function-provided polarizing plate, and a light transmissive fixation layer interposed between and bonding the phase difference function-provided polarizing plate and the protection panel. The structural element and the phase difference function-provided polarizing plate overlap each other by an overlap distance of 1.5 mm or less.

14 Claims, 8 Drawing Sheets

DISPLAY DEVICE

CROSS REFERENCE TO RELATED APPLICATION

This application claims priority from Japanese Patent Application No. 2018-4158 filed on Jan. 15, 2018. The entire contents of the priority application are incorporated herein by reference.

TECHNICAL FIELD

The technology described herein relates to a display device.

BACKGROUND

An example of conventionally known liquid crystal display (LCD) device includes an optical stack including, in sequence, a transparent front plate, an ultraviolet (UV)-curable adhesive layer, a polarizing plate, a pressure-sensitive adhesive layer, and a transparent substrate. The UV-curable adhesive layer is formed of a UV-curable adhesive composition containing an acrylic ester monomer having an ester moiety having 6 to 11 carbon atoms. Exerting 3 kg load on the pressure-sensitive adhesive layer that has been attached on an alkali-free glass substrate over an area of 25 mm×25 mm will results in creep in a range from 90 to 1,000 μm after 3,000 seconds under conditions of a temperature of 23° C. and a relative humidity of 55%. An example of such a liquid crystal display (LCD) device is disclosed in Japanese Unexamined Patent Application Publication No. 2014-213488.

The technology described in Japanese Unexamined Patent Application Publication No. 2014-213488 has a configuration in which the transparent front plate is stacked on the liquid crystal display device using the UV-curable adhesive layer disposed therebetween. This configuration prevents deformation, by the UV-curable adhesive layer, of the pressure-sensitive adhesive layer that bonds the polarizing plate to the transparent substrate, thereby preventing uneven reflection. In the liquid crystal display device, turn-on of a power supply causes a heat-generating component such as a light source to generate heat, thereby causing thermal expansion of a component, while turn-off of the power supply causes thermal shrinkage of a component. A transparent substrate and a transparent front plate of a liquid crystal panel, each being a large-sized component in a liquid crystal display device, significantly expand or shrink in thermal expansion or in thermal shrinkage. Therefore, a difference in the linear expansion coefficient among the transparent substrate, the transparent front plate, and the UV-curable adhesive layer stacked one on top of another may cause stress to act on these components. In recent years, the polarizing plate may also have a phase difference function for purposes such as viewing angle compensation. During use of such a polarizing plate, action of the stress mentioned above on the liquid crystal panel may cause an uneven color region, where a displayed color differs from the intended color, to occur locally in and near a region where the stress acts.

SUMMARY

The technology described herein was made in view of the above circumstances. An object is to reduce or prevent occurrence of an uneven color region.

A display device of the technology described herein includes a display panel, a phase difference function-provided polarizing plate, a protection panel, a structural element, and a light transmissive fixation layer. The display panel is configured to display an image. The phase difference function-provided polarizing plate is attached to the display panel. The protection panel is disposed to interpose the phase difference function-provided polarizing plate between the display panel and the protection panel. The structural element projects from a plate surface of the protection panel, and the plate surface is opposite the phase difference function-provided polarizing plate. The light transmissive fixation layer is interposed between and bonds the phase difference function-provided polarizing plate and the protection panel. The structural element and the phase difference function-provided polarizing plate overlap each other by an overlap distance of 1.5 mm or less.

This configuration causes light output from the display panel to be polarized and obtain a phase difference during passage through the phase difference function-provided polarizing plate, thereby achieving, for example, viewing angle compensation. The light output from the phase difference function-provided polarizing plate passes through the light transmissive fixation layer and the protection panel to the outside of the display device. The phase difference function-provided polarizing plate is protected by the protection panel, and is fixed to the protection panel by the light transmissive fixation layer. The structural element projects from a plate surface of the protection panel, adjacent to the phase difference function-provided polarizing plate. Arrangement of this structural element to overlap the phase difference function-provided polarizing plate prevents the front surface of the display panel from being directly viewable when viewed from the front of this lighting device, thereby achieving an improved appearance.

Note here that the display panel, the phase difference function-provided polarizing plate, the light transmissive fixation layer, and the protection panel will undergo thermal expansion or thermal shrinkage upon an occurrence of a thermal environmental change by amounts of expansion or shrinkage dependent on the linear expansion coefficients of the respective components. More specifically, the structural element projecting from a plate surface of the protection panel is disposed to overlap the phase difference function-provided polarizing plate. This configuration may induce high stress in and near the overlap region between the structural element and the phase difference function-provided polarizing plate. Along with a phase difference imparted to the light by the phase difference function-provided polarizing plate, action of such stress on the display panel may locally change a displayed color to a color different from the intended color. In this respect, use of an overlap distance of 1.5 mm or less in an overlap region between the structural element and the phase difference function-provided polarizing plate reduces the stress that may act in and near the overlap region in the display panel between the structural element and the phase difference function-provided polarizing plate as compared to when the above-mentioned overlap distance would be greater than 1.5 mm. Thus, the above configuration reduces the occurrence of a locally observed uneven color region in the display panel.

According to the technology described herein, an occurrence of an uneven color region can be reduced or prevented.

DETAILED DESCRIPTION

First Embodiment

Figure 2:
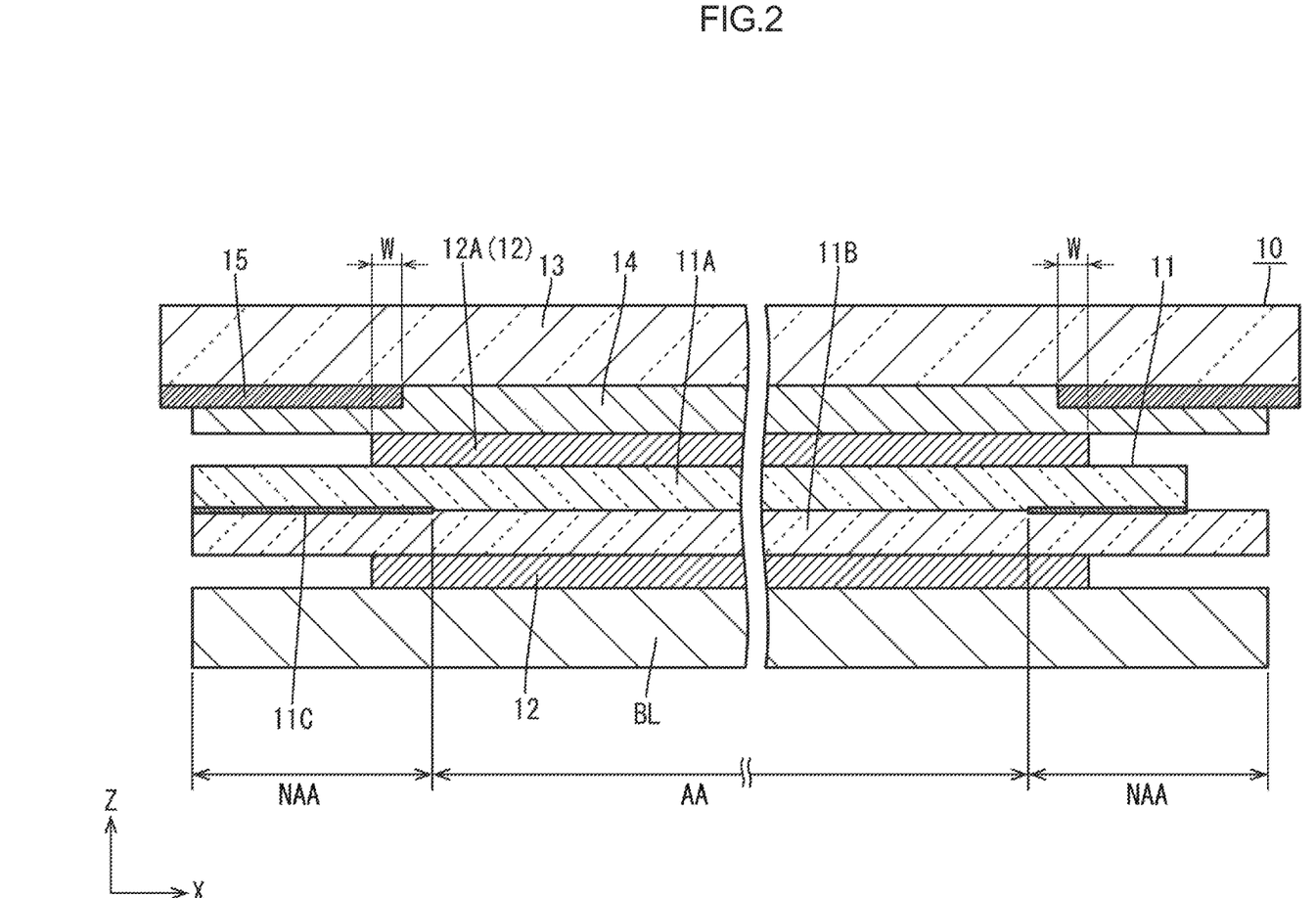
FIG. 2 is a cross-sectional view taken along line A-A of FIG. 1.
Figure 3:
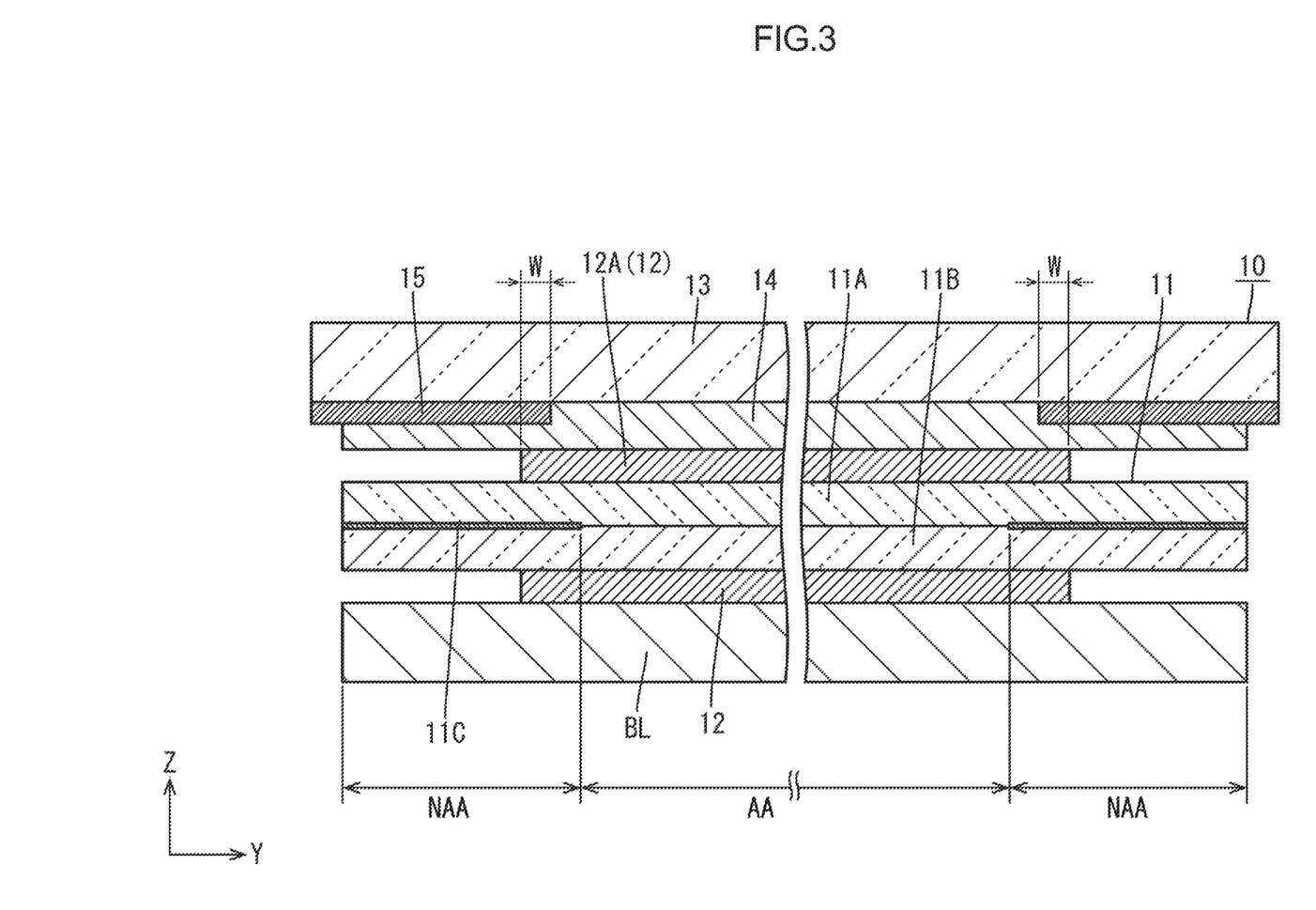
FIG. 3 is a cross-sectional view taken along line B-B of FIG. 1.

A first embodiment will be described with reference to FIGS. 1 to 4. This embodiment describes a liquid crystal display device 10 by way of example. An X-axis, a Y-axis, and/or a Z-axis are indicated in some of the drawings, and the illustrations therein are provided in the directions as indicated. FIGS. 2 and 3 illustrate the front side of the liquid crystal display device 10 as upward, and the rear side of the liquid crystal display device 10 as downward.

Figure 1:
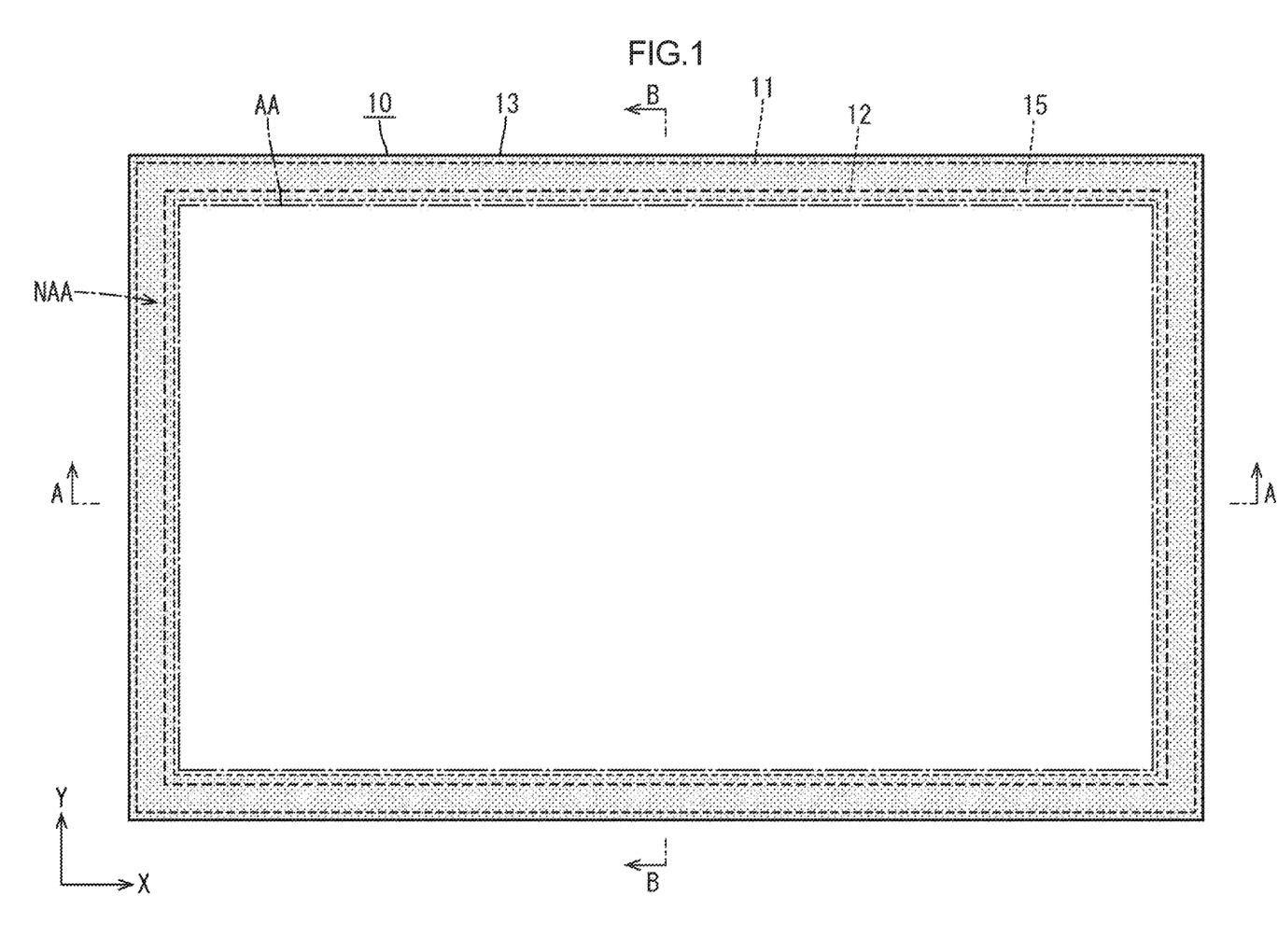
FIG. 1 is a plan view of a liquid crystal display device according to a first embodiment.

As illustrated in FIG. 1, the liquid crystal display device 10 has an outline of a widthwise-elongated rectangular shape, whose longitudinal direction and lateral direction are parallel to an X-axis direction and to a Y-axis direction, respectively. As illustrated in FIG. 2, the liquid crystal display device 10 includes, at least, a liquid crystal panel (display panel) 11, polarizing plates 12, a cover glass (protection panel) 13, a light transmissive fixation layer 14, and a backlight device BL. The liquid crystal panel 11 displays an image. The polarizing plates 12 are respectively attached to front and rear plate surfaces of the liquid crystal panel 11. The cover glass 13 is disposed to cover, from the front side, one of the polarizing plates 12 (i.e., "phase difference function-provided polarizing plate 12A" to be described later) disposed on the front side of the liquid crystal panel 11. The light transmissive fixation layer 14 is interposed between, and is fixed to, the one of the polarizing plates 12 disposed on the front side of the liquid crystal panel 11, and the cover glass 13. The backlight device BL is an external light source disposed on the rear side (opposite side from the cover glass 13) of the liquid crystal panel 11 to face the liquid crystal panel 11, and to emit light for a display operation on the liquid crystal panel 11.

The liquid crystal panel 11 includes, as illustrated in FIGS. 2 and 3, a pair of substrates 11A and 11B, substantially transparent and made of glass, bonded together with a predetermined gap (cell gap) therebetween. The liquid crystal panel 11 also includes a liquid crystal layer (not shown) encapsulated between the substrates 11A and 11B. The liquid crystal panel 11 according to this embodiment operates in an in-plane switching (IPS) mode. In an IPS mode, liquid crystal molecules forming the liquid crystal layer are horizontally orientated. The substrate 11B of the pair of substrates 11A and 11B is the one disposed on the rear side, and is an array substrate (active matrix substrate). The array substrate 11B includes switching elements (e.g., thin film transistors (TFTs)) each coupled to a source line and to a gate line arranged perpendicular to each other, pixel electrodes coupled to those switching elements, and an alignment film. The substrate 11A is one disposed on the front side, and is a color filter (CF) substrate (counter substrate). The CF substrate 11A includes a color filter including coloring elements, such as red (R), green (G), and blue (B) elements, arranged in a predetermined arrangement, and a light-shielding element (black matrix or display panel-side light-shielding element) separating coloring elements positioned adjacent to each other. The CF substrate 11A also includes an alignment film. The light-shielding element includes not only a lattice element (not shown) separating coloring elements positioned adjacent to each other, but also a frame element 11C disposed around the entire perimeter of an outer perimeter portion of the CF substrate 11A. FIG. 2 illustrates the frame element 11C using a bold line. The liquid crystal panel 11 has a display region (active area) AA where an image is displayed, and a non-display region (non-active area) NAA where no image is displayed. The non-display region NAA has a frame shape surrounding the display region AA. The frame element 11C is disposed to surround the display region AA, define the display region AA, and, almost in the entire portion thereof, overlap the non-display region NAA.

As illustrated in FIGS. 2 and 3, the polarizing plates 12 are disposed over both the display region AA and the non-display region NAA of the liquid crystal panel 11. More specifically, the polarizing plates 12 each overlap, as viewed vertically, the entire portion of the display region AA (region in the light-shielding element, where the frame element 11C is not formed) and an inner perimeter-side portion of the non-display region NAA (frame element 11C). The polarizing plates 12 each have a film shape having a plate surface facing the corresponding plate surface of the liquid crystal panel 11. The polarizing plates 12 each have at least a polarizing layer that linearly polarizes natural light. The polarizing layer has a structure including a polarizer interposed between protection films, such as triacetyl cellulose (TAC) films. The polarizer is produced by addition of an absorber, such as iodine or a dichromatic dye, to a polymer resin film, such as a polyvinyl alcohol (PVA) film, and stretching of the polymer resin film in one direction to orient the absorber. The polarizing plate 12, of the front and rear pair of polarizing plates 12, disposed on the front side, is a phase difference function-provided polarizing plate 12A having a phase difference function. To distinguish from the polarizing plate 12 disposed on the rear side, the polarizing plate 12 disposed on the front side is hereinafter also referred to as "phase difference function-provided polarizing plate" indicated by a reference character having a suffix A. The phase difference function-provided polarizing plate 12A includes a phase difference layer (phase difference plate) that imparts a phase difference to light transmitted therethrough. The phase difference layer formed by, for example, uniaxially or biaxially stretching of the polymer resin, imparts a phase difference to light transmitted therethrough, and can thus compensate degradation in viewing angle characteristic due to causes such as a birefringence property of the liquid crystal layer. The polarizing plates 12 each further include a lamination layer (protection layer) that protects the polarizing layer, and a fixation layer fixed to the corresponding plate surface of each of the substrates 11A and 11B of the liquid crystal panel 11.

As illustrated in FIG. 1, the cover glass 13 has a widthwise-elongated rectangular shape to cover, from the front side, almost the entire portions of the liquid crystal panel 11 and of the phase difference function-provided polarizing plate 12A to protect the liquid crystal panel 11 and the phase difference function-provided polarizing plate 12A. As illustrated in FIGS. 2 and 3, the cover glass 13 is disposed to face the front side of the phase difference function-provided polarizing plate 12A. The cover glass 13 is fixed to the phase difference function-provided polarizing plate 12A by means of the light transmissive fixation layer 14 interposed therebetween. The light transmissive fixation layer 14 includes a substantially transparent, highly light-transmissive adhesive layer, such as an optical clear adhesive (OCA) film. The light transmissive fixation layer 14 may be formed of, for example, a UV-curable resin material that cures under UV radiation. The light transmissive fixation layer 14 is formed in a size slightly greater than the phase difference function-provided polarizing plate 12A, and slightly smaller than the cover glass 13. Thus, light output from the phase difference function-provided polarizing plate 12A passes through the light transmissive fixation layer 14 and the cover glass 13 to the outside of the liquid crystal display device 10. A frame-shaped light-shielding element (structural element or protection panel-side light-shielding element) 15 having a light-shielding property is provided on an outer perimeter portion of the cover glass 13 extending along the entire perimeter of the cover glass 13. The frame-shaped light-shielding element 15 forms a light-shielding film formed of a light-shielding material (e.g., carbon black or a metal material) on the rear-side plate surface of the cover glass 13. The frame-shaped light-shielding element 15 forms a "structural element" projecting a distance equivalent to the thickness of the light-shielding film from the rear-side plate surface toward the rear side (i.e., toward the phase difference function-provided polarizing plate 12A). The frame-shaped light-shielding element 15 overlaps the frame element 11C (non-display region NAA) of the light-shielding element in the liquid crystal panel 11, except for an inner perimeter portion of the liquid crystal panel 11. In other words, the frame-shaped light-shielding element 15 surrounds an area slightly larger than the display region AA surrounded by the frame element 11C of the light-shielding element in the liquid crystal panel 11. The frame-shaped light-shielding element 15 overlaps, and is in contact with, the light transmissive fixation layer 14 in most of an inner perimeter-side portion of the frame-shaped light-shielding element 15. The frame-shaped light-shielding element 15 is indicated by hatching in FIG. 1. The cover glass 13 has a plate shape, and is made of substantially transparent, highly light-transmissive glass, preferably of tempered glass. The tempered glass used for the cover glass 13 is preferably, for example, chemically tempered glass including a chemically tempered layer on a surface thereof by treating the surface of a glass base plate using a chemical tempering process. However, the tempered glass used for the cover glass 13 is not limited thereto.

The frame-shaped light-shielding element 15 is disposed, as illustrated in FIGS. 2 and 3, to overlap the phase difference function-provided polarizing plate 12A as viewed vertically. More specifically, the frame-shaped light-shielding element 15 is disposed such that an inner perimeter portion thereof overlaps, along the entire perimeter thereof, an outer perimeter portion of the phase difference function-provided polarizing plate 12A. This configuration makes, viewable by a user from the front of the liquid crystal display device 10, the front surface of the phase difference function-provided polarizing plate 12A attached to the front surface of the liquid crystal panel 11, and the front surface of the frame-shaped light-shielding element 15 provided on a surface of the cover glass 13, thereby preventing the front surface of the liquid crystal panel 11 from being directly viewed by a user. This provides an improved appearance as compared to when the frame-shaped light-shielding element would be disposed not to overlap the phase difference function-provided polarizing plate 12A, and thus allow the front surface of the liquid crystal panel 11 to be directly viewable from the front of the liquid crystal display device 10.

As illustrated in FIGS. 2 and 3, the liquid crystal panel 11, the polarizing plates 12, the light transmissive fixation layer 14, and the cover glass 13 stacked one on top of another to together form the liquid crystal display device 10 may undergo thermal expansion or thermal shrinkage upon an occurrence of a thermal environmental change, by amounts of expansion or shrinkage dependent on the linear expansion coefficients of the respective components. More specifically, the frame-shaped light-shielding element 15 projecting from the rear-side plate surface of the cover glass 13 is disposed to overlap the phase difference function-provided polarizing plate 12A. This configuration may induce high stress in and near the overlap region between the frame-shaped light-shielding element 15 and the phase difference function-provided polarizing plate 12A due to a level difference at the inner perimeter portion of the frame-shaped light-shielding element 15. Along with a phase difference imparted to the light by the phase difference function-provided polarizing plate 12A, action of this stress on the liquid crystal panel 11 may locally change a displayed color to a color different from the intended color. Accordingly, the frame-shaped light-shielding element 15 according to this embodiment is configured to have an overlap distance (overlapping width) W of 1.5 mm or less in an overlap region with the phase difference function-provided polarizing plate 12A. This configuration can reduce the stress that may act in and near the overlap region in the cover glass 13 between the frame-shaped light-shielding element 15 and the phase difference function-provided polarizing plate 12A as compared to when the above-mentioned overlap distance would be greater than 1.5 mm. Thus, the above configuration reduces the occurrence of a locally observed uneven color region in the liquid crystal panel 11. More preferably, the frame-shaped light-shielding element 15 is configured to have an overlap distance W of 0.5 mm or less in an overlap region with the phase difference function-provided polarizing plate 12A. This configuration can more suitably reduce the stress that may act in and near the overlap region in the cover glass 13 between the frame-shaped light-shielding element 15 serving as a structural element, and the phase difference function-provided polarizing plate 12A as compared to when the above-mentioned overlap distance would be greater than 0.5 mm. Thus, the above configuration further reduces the occurrence of a locally observed uneven color region in the liquid crystal panel 11.

In addition, the frame-shaped light-shielding element 15 having a longitudinally elongated frame shape as viewed vertically is disposed such that, as illustrated in FIGS. 1 to 3, a pair of longitudinal inner end portions and a pair of lateral inner end portions respectively overlap a pair of longitudinal outer end portions and a pair of lateral outer end portions of the phase difference function-provided polarizing plate 12A, and that each of the overlap regions has an overlap distance W of 1.5 mm or less, more preferably, of 0.5 mm or less. The pair of lateral inner end portions of the frame-shaped light-shielding element 15 is a pair of end portions facing each other in the X-axis direction (i.e., longitudinal direction or longer side direction), along which the polarizing plate 12 and the cover glass 13 expand or shrink particularly in large amounts upon an occurrence of a thermal environmental change. Thus, there is concern that this characteristic may cause higher stress to act in and near the overlap regions between the pair of lateral inner end portions of the frame-shaped light-shielding element 15 and the pair of lateral outer end portions of the phase difference function-provided polarizing plate 12A. On this point, an overlap distance W of 1.5 mm or less, and more preferably of 0.5 mm or less, in each of the overlap regions between the pair of lateral inner end portions of the frame-shaped light-shielding element 15 and the pair of lateral outer end portions of the phase difference function-provided polarizing plate 12A can more effectively reduce the stress that may act in and near the overlap regions. In addition, an overlap distance W of 1.5 mm or less, and more preferably of 0.5 mm or less, in each of the overlap regions between the pair of longitudinal inner end portions of the frame-shaped light-shielding element 15 and the pair of longitudinal outer end portions of the phase difference function-provided polarizing plate 12A can suitably reduce the stress that may act in and near the outer perimeter portion of the liquid crystal panel 11 along the entire perimeter. Thus, this configuration reduces the occurrence of a frame-shaped uneven color region in the liquid crystal panel 11.

As described above, the frame-shaped light-shielding element 15 and the phase difference function-provided polarizing plate 12A have four overlap regions as illustrated in FIGS. 1 to 3, and are configured such that the overlap distances W in the respective overlap regions may differ by 500 μm or less. This embodiment assumes that the overlap regions have almost the same overlap distance W, meaning that a difference in the overlap distance W is, or is nearly, 0 μm. An overlap distance difference greater than 500 μm would possibly make an uneven color region more visually perceptible in and near an overlap region having a relatively large overlap distance. However, use of an overlap distance W of 500 μm or less as described above makes an uneven color region less visually perceptible in and near all of the overlap regions.

Figure 4:
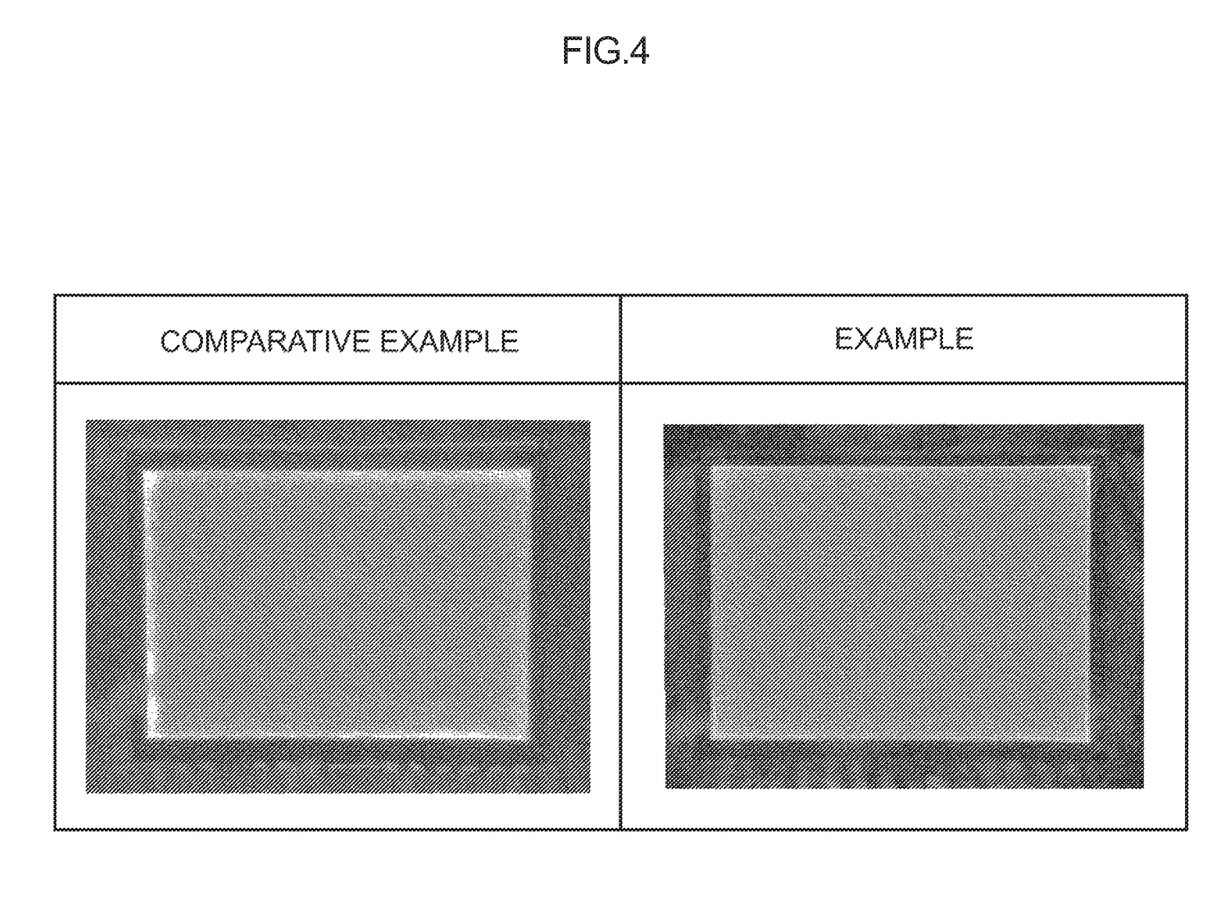
FIG. 4 is a table illustrating photographs taken from the front of liquid crystal display devices respectively according to a comparative example relating to a comparison experiment and to an example.

To verify the advantage in designing the overlap distance W as 1.5 mm or less in an overlap region between the frame-shaped light-shielding element 15 and the phase difference function-provided polarizing plate 12A, a comparison experiment was carried out as described below. The comparison experiment was carried out involving an example using overlap distances W of 1 mm in overlap regions between the frame-shaped light-shielding element 15 and the phase difference function-provided polarizing plate 12A around the entire perimeter, and involving a comparative example using overlap distances of 1 mm in three sides, but an overlap distance of 3.5 mm only in one side (left shorter side illustrated in FIG. 4), in overlap regions between the frame-shaped light-shielding element 15 and the phase difference function-provided polarizing plate 12A. The liquid crystal display device 10 according to the example was configured as described in preceding paragraphs, while the liquid crystal display device according to the comparative example was configured similarly to what has been described in preceding paragraphs except for the overlap distances in the overlap regions between the frame-shaped light-shielding element 15 and the phase difference function-provided polarizing plate 12A. The liquid crystal display devices according to the comparative example and to the example were imaged from the front thereof over a white image (highest tone image), and the resulting photographs are illustrated in the table of FIG. 4. The left part and the right part of FIG. 4 respectively illustrate the photographs from the comparative example and from the example. In each of the photographs illustrated in FIG. 4, the largest black frame is the background, and the inner black frame indicates where the frame-shaped light-shielding element 15 is formed. The next inner light tone region is the display region AA. Experimental results will next be described. As can be seen in FIG. 4, the liquid crystal display device according to the comparative example exhibits an uneven color region having vertical stripes in and near the left laterally end portion in the display region AA, but exhibits little uneven color regions in and near the right laterally end portion and in and near the pair of longitudinal end portions in the display region AA. In contrast, it can be seen that the liquid crystal display device according to the example exhibits little uneven color regions in the outer perimeter portion of the display region AA. These results lead to a conclusion, as demonstrated by the example, that use of an overlap distance W of 1.5 mm or less in the overlap regions between the frame-shaped light-shielding element 15 and the phase difference function-provided polarizing plate 12A around the entire perimeter can reduce or prevent an occurrence of an uneven color region along the entire perimeter.

As described above, the liquid crystal display device (display device) 10 according to this embodiment includes the liquid crystal panel (display panel) 11, the phase difference function-provided polarizing plate 12A, the cover glass (protection panel) 13, the frame-shaped light-shielding element 15, and the light transmissive fixation layer 14. The liquid crystal panel 11 displays an image. The phase difference function-provided polarizing plate 12A is attached to the liquid crystal panel 11. The cover glass 13 is disposed to interpose the phase difference function-provided polarizing plate 12A between the liquid crystal panel 11 and the cover glass 13. The frame-shaped light-shielding element 15 serves as a structural element, projecting from the plate surface of the cover glass 13, adjacent to the phase difference function-provided polarizing plate 12A. The light transmissive fixation layer 14 is interposed between, and bonds together, the phase difference function-provided polarizing plate 12A and the cover glass 13. The frame-shaped light-shielding element 15 serving as a structural element, and the phase difference function-provided polarizing plate 12A overlap each other by an overlap distance W of 1.5 mm or less.

This configuration causes the light output from the liquid crystal panel 11 to be polarized and obtain a phase difference during passage through the phase difference function-provided polarizing plate 12A, thereby achieving, for example, viewing angle compensation. The light output from the phase difference function-provided polarizing plate 12A passes through the light transmissive fixation layer 14 and the cover glass 13 to the outside of the liquid crystal display device 10. The phase difference function-provided polarizing plate 12A is protected by the cover glass 13, and is fixed to the cover glass 13 by the light transmissive fixation layer 14. The frame-shaped light-shielding element 15, serving as a structural element, projects from the plate surface of the cover glass 13, adjacent to the phase difference function-provided polarizing plate 12A. Arrangement of this frame-shaped light-shielding element 15 serving as a structural element to overlap the phase difference function-provided polarizing plate 12A prevents the front surface of the liquid crystal panel 11 from being directly viewable when viewed from the front of the liquid crystal display device 10, thereby achieving an improved appearance.

Note here that the liquid crystal panel 11, the phase difference function-provided polarizing plate 12A, the light transmissive fixation layer 14, and the cover glass 13 will undergo thermal expansion or thermal shrinkage upon an occurrence of a thermal environmental change by amounts of expansion or shrinkage dependent on the linear expansion coefficients of the respective components. More specifically, the frame-shaped light-shielding element 15 serving as a structural element and projecting from the corresponding plate surface of the cover glass 13 is disposed to overlap the phase difference function-provided polarizing plate 12A. This configuration may induce high stress in and near the overlap region between the frame-shaped light-shielding element 15 serving as a structural element and the phase difference function-provided polarizing plate 12A. Along with a phase difference imparted to the light by the phase difference function-provided polarizing plate 12A, action of such stress on the liquid crystal panel 11 may locally change a displayed color to a color different from the intended color. In this respect, use of an overlap distance W of 1.5 mm or less in an overlap region between the frame-shaped light-shielding element 15 serving as a structural element and the phase difference function-provided polarizing plate 12A reduces the stress that may act in and near the overlap region in the cover glass 13 between the frame-shaped light-shielding element 15 serving as a structural element, and the phase difference function-provided polarizing plate 12A as compared to when the above-mentioned overlap distance would be greater than 1.5 mm. Thus, the above configuration reduces the occurrence of a locally observed uneven color region in the liquid crystal panel 11.

In one aspect, the frame-shaped light-shielding element 15 serving as a structural element and the phase difference function-provided polarizing plate 12A is configured to overlap each other by an overlap distance W of 0.5 mm or less. This configuration can more suitably reduce the stress that may act in and near an overlap region in the cover glass 13 between the frame-shaped light-shielding element 15 serving as a structural element, and the phase difference function-provided polarizing plate 12A as compared to when the above-mentioned overlap distance would be greater than 0.5 mm. Thus, the above configuration further reduces the occurrence of a locally observed uneven color region in the liquid crystal panel 11.

In addition, the liquid crystal panel 11, the phase difference function-provided polarizing plate 12A, and the cover glass 13 each have a longitudinally elongated shape, and the frame-shaped light-shielding element 15 serving as a structural element overlaps, at least, both longitudinal end portions of the phase difference function-provided polarizing plate 12A. The liquid crystal panel 11, the phase difference function-provided polarizing plate 12A, and the cover glass 13 each having a longitudinally elongated shape tend to expand or shrink in large amounts particularly along the longitudinal direction, upon an occurrence of a thermal environmental change. Thus, there is concern that this characteristic may cause higher stress to act in and near the regions where the frame-shaped light-shielding element 15 serving as a structural element overlaps, at least, both longitudinal end portions of the phase difference function-provided polarizing plate 12A. On this point, an overlap distance W of 1.5 mm or less in the regions where the frame-shaped light-shielding element 15 serving as a structural element and at least both longitudinal end portions of the phase difference function-provided polarizing plate 12A overlap each other, can suitably reduce the stress that may act in and near the longitudinal end portions of the liquid crystal panel 11. Thus, the above configuration reduces the occurrence of a band-shaped uneven color region in the liquid crystal panel 11.

The frame-shaped light-shielding element 15 serving as a structural element overlaps, along the entire perimeter, the outer perimeter portion of the phase difference function-provided polarizing plate 12A. This configuration can suitably reduce the stress that may act in and near the outer perimeter portion of the liquid crystal panel 11, thereby reducing the occurrence of a frame-shaped uneven color region in the liquid crystal panel 11.

The frame-shaped light-shielding element 15 serving as a structural element and the phase difference function-provided polarizing plate 12A overlap each other in multiple overlap regions, and are configured such that the overlap distances W in the multiple overlap regions may differ by 500 μm or less. An overlap distance difference greater than 500 μm would possibly make an uneven color region more visually perceptible in and near an overlap region having a relatively large overlap distance. However, use of an overlap distance W of 500 μm or less makes an uneven color region less visually perceptible in and near all of the overlap regions.

The structural element is disposed around the entire perimeter of the outer perimeter portion of the cover glass 13 to form the frame-shaped light-shielding element 15 having a light-shielding property. This configuration enables the frame-shaped light-shielding element 15 to provide light shielding of the outer perimeter portion of the cover glass 13 along the entire perimeter thereof. The frame-shaped light-shielding element 15 serving as a structural element having a light-shielding property is configured to overlap the phase difference function-provided polarizing plate 12A, thereby reducing or preventing leakage, to the outside, of the light that has passed through an overlap region in the phase difference function-provided polarizing plate 12A. This can improve the display quality.

Second Embodiment

A second embodiment will be described with reference to FIGS. 5 to 8. The second embodiment describes a liquid crystal display device 110 including a cover glass 113, which is a variation of the cover glass 13 of the first embodiment. Configuration, actions, and effects similar to those of the first embodiment will not be described.

Figure 5:
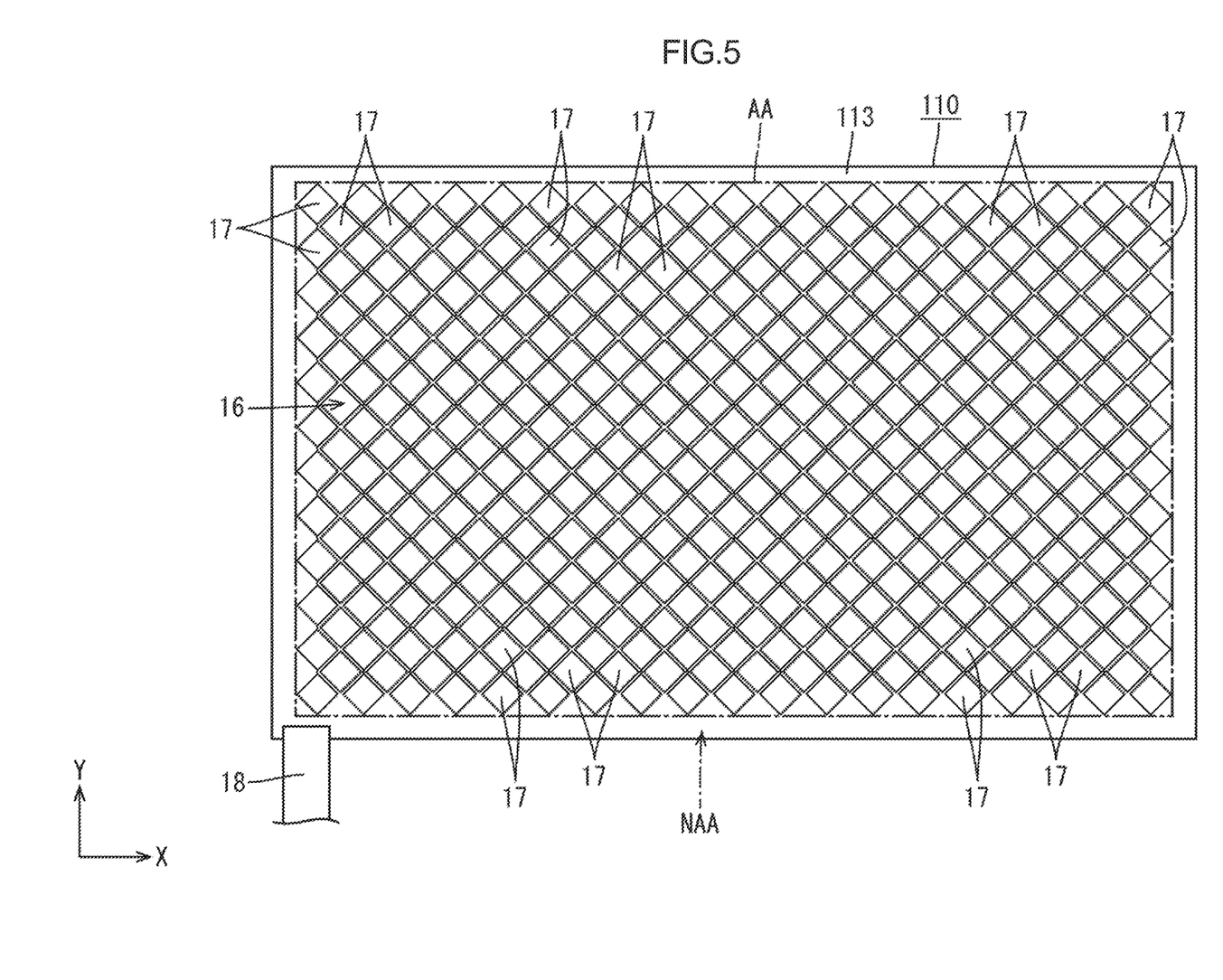
FIG. 5 is a plan view illustrating a touch panel pattern of a cover glass included in a liquid crystal display device according to a second embodiment.

The cover glass 113 according to this embodiment includes, as illustrated in FIG. 5, the touch panel patterned element 16 that detects an input position where a user of the liquid crystal display device 110 inputs position information based on an image displayed in the display region AA of a liquid crystal panel 111. The touch panel patterned element 16 is of a projected capacitive type, and performs detection using, for example, the self-capacitance principle. The touch panel patterned element 16 is formed by deposition of a transparent electrode film over the rear-side plate surface of the cover glass 113, followed by patterning of the transparent electrode film. The touch panel patterned element 16 includes, at least, touch electrodes (position detection electrodes) 17 arranged in a matrix having multiple rows and columns along the X-axis direction and the Y-axis direction in the display region AA of the liquid crystal panel 111. The multiple touch electrodes 17 are disposed in an area (touch area) of the cover glass 113, overlapping the display region AA of the liquid crystal panel 111. Thus, the display region AA of the liquid crystal panel 111 substantially coincides with the touch area where an input position is detectable, while the non-display region NAA of the liquid crystal panel 111 substantially coincides with the non-touch area where an input position is undetectable. Moving by a user a finger (position-inputting element), which is an electrical conductor, into close proximity to the surface of the cover glass 113 to input position information based on the image in the display region AA viewed by the user forms a capacitance between the finger and a touch electrode 17 close to the finger, of the touch electrodes 17. Accordingly, the capacitance detected by a touch electrode 17 close to the finger changes, as the finger approaches to that touch electrode 17, to a capacitance different from the capacitance of a touch electrode 17 distant from the finger, of the touch electrodes 17. This principle enables the input position to be detected.

Figure 6:
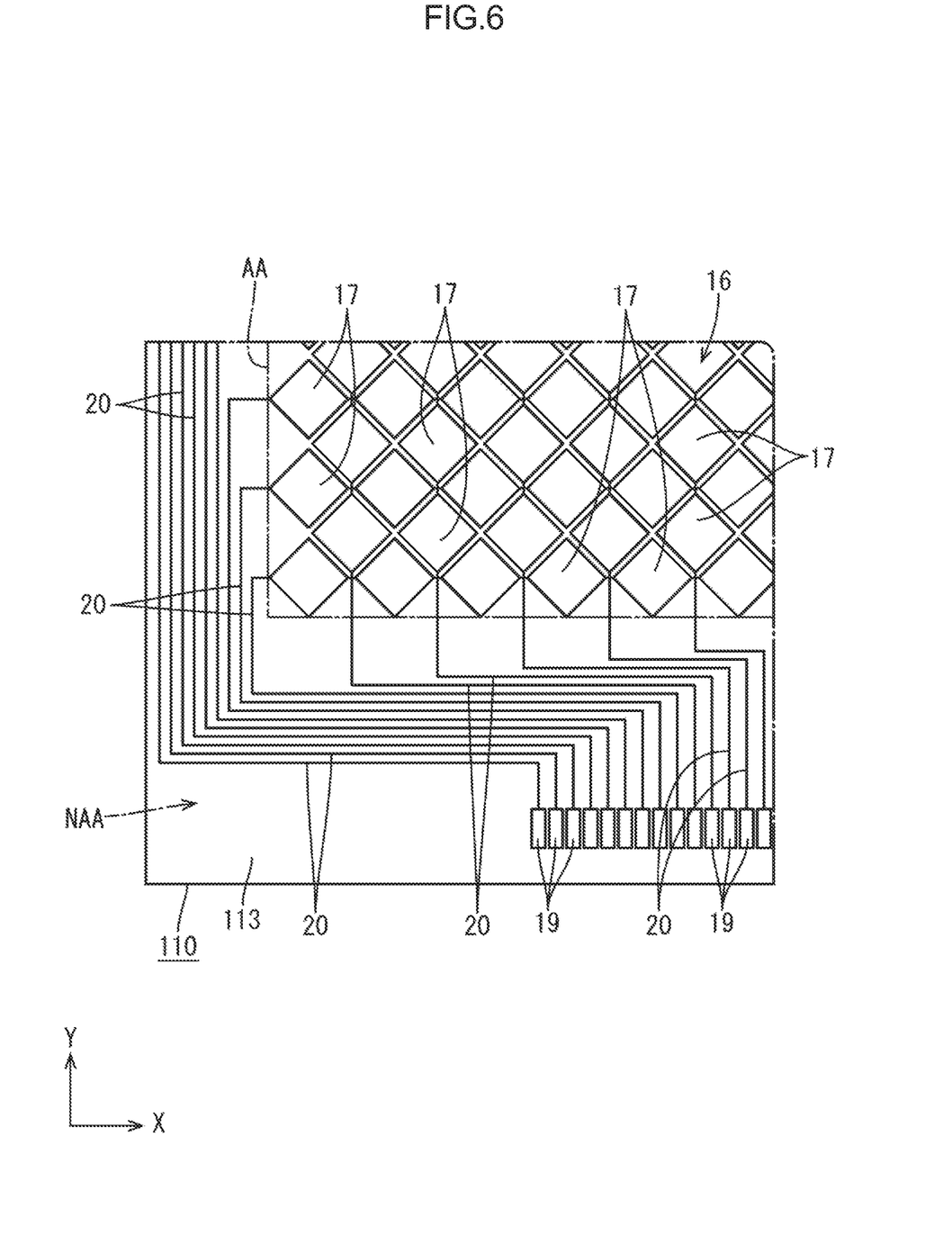
FIG. 6 is a plan view illustrating the touch panel patterned element enlarged in a corner portion of the cover glass.
Figure 7:
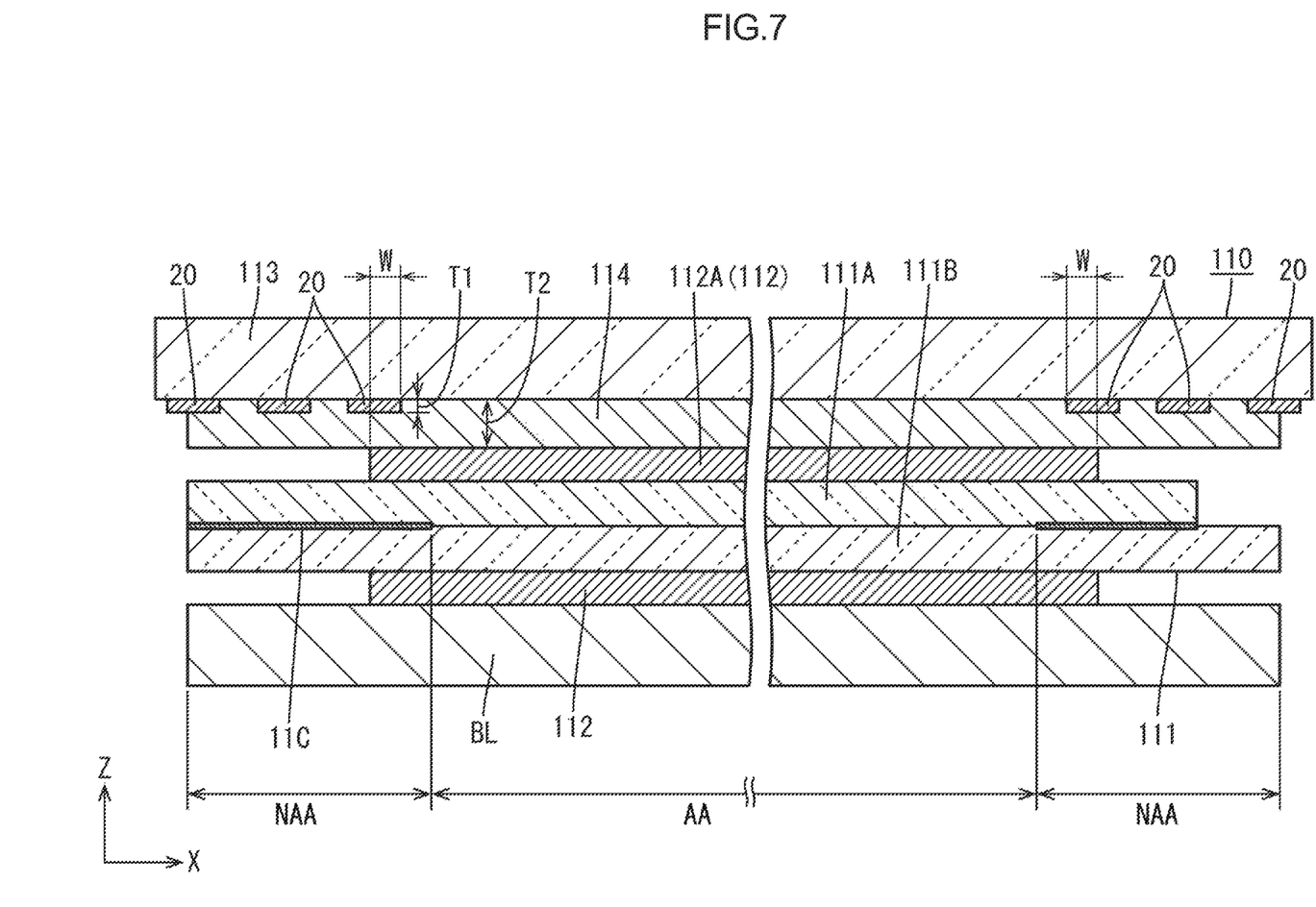
FIG. 7 is a cross-sectional view of the liquid crystal display device taken along the longitudinal direction.
Figure 8:
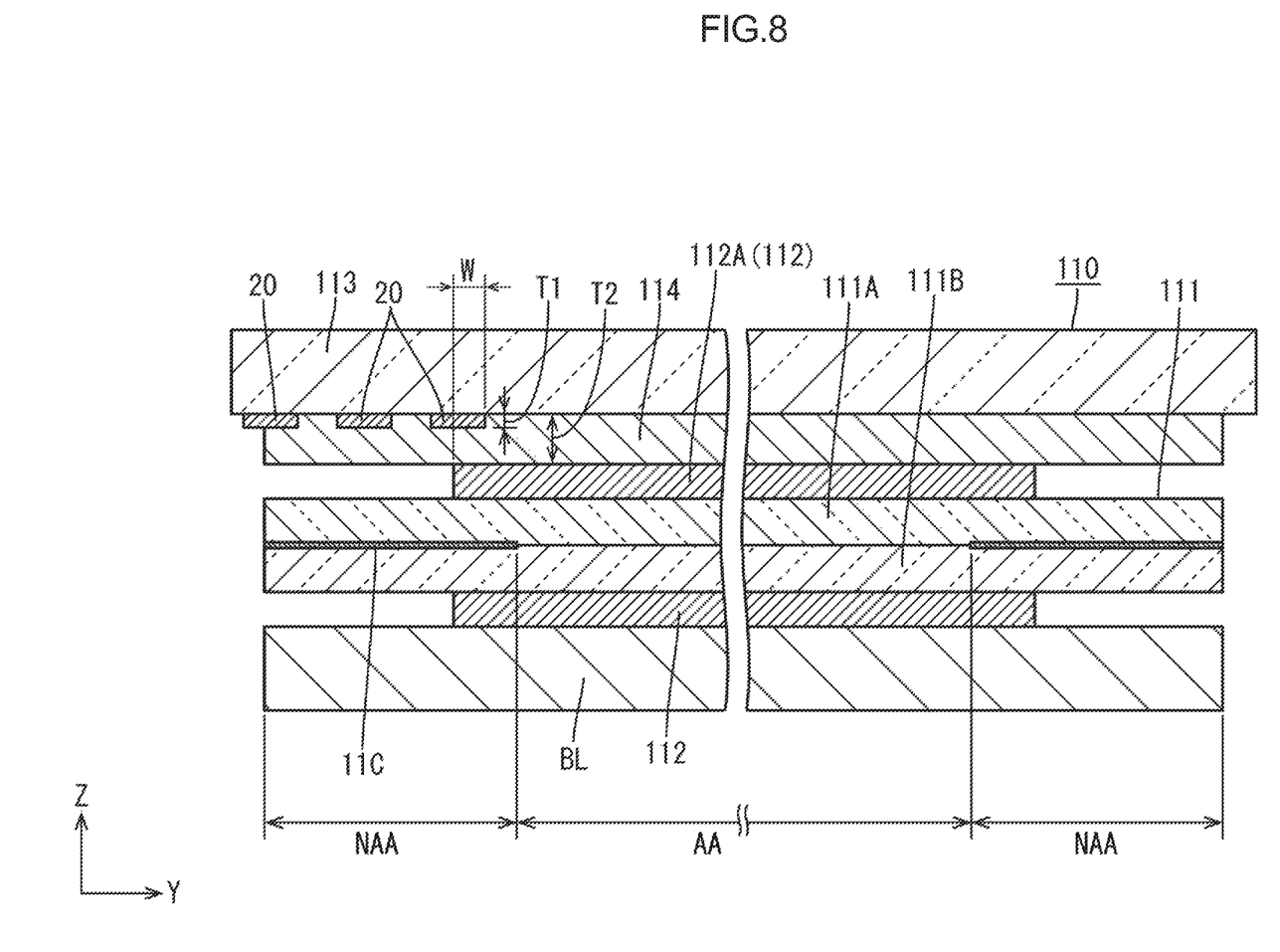
FIG. 8 is a cross-sectional view of the liquid crystal display device taken along the lateral direction.

The cover glass 113 is connected with a touch panel flexible substrate 18, as illustrated in FIG. 5, in one corner portion of an outer perimeter portion (i.e., non-touch area) of the cover glass 113. The touch panel flexible substrate 18 transmits, for example, a signal from a touch panel control circuit (not shown). The cover glass 113 includes terminals 19 in a portion where the touch panel flexible substrate 18 is connected as illustrated in FIG. 6. The terminals 19 are electrically conductively connected to terminals (not shown) of the touch panel flexible substrate 18. The cover glass 113 also includes multiple wires (structural elements) 20 in the outer perimeter portion of the cover glass 113. The wires 20 are connected between the terminals 19 and the touch panel patterned element 16. More specifically, the wires 20 are arranged in parallel to one another to surround the touch area (i.e., display region AA), in the outer perimeter portion of the cover glass 113. The wires 20 each have one end connected to a corresponding one of the terminals 19, and another end connected to a corresponding one of the touch electrodes 17 included in the touch panel patterned element 16. The wires 20 are formed by patterning of a metal film formed on the rear-side plate surface of the cover glass 113. The wires 20 have a wiring resistance lower than the wiring resistance of the touch panel patterned element 16 formed from a transparent electrode film. The wires 20 are disposed along the longer side where the touch panel flexible substrate 18 is connected and along the pair of shorter sides of the outer perimeter portion of the cover glass 113 (see FIG. 5). As illustrated in FIGS. 7 and 8, the wires 20 are disposed spaced apart from each other both in the X-axis direction and in the Y-axis direction in the outer perimeter portion of the cover glass 113. The wires 20 each form a "structural element" projecting a distance equivalent to the thickness of the metal film from the rear-side plate surface of the cover glass 113 toward the rear side of the liquid crystal display device 110 (i.e., toward a phase difference function-provided polarizing plate 112A). Note that FIGS. 7 and 8 omit the touch panel patterned element 16.

An innermost one (i.e., one closest to the display region AA) of the wires 20 arranged in both the X-axis direction and the Y-axis direction is disposed, as illustrated in FIGS. 7 and 8, to overlap, as viewed vertically, an outer end portion of the phase difference function-provided polarizing plate 112A, which is the polarizing plate 112 on the front side, by an overlap distance (overlapping width) W of 1.5 mm or less, preferably of 0.5 mm or less. Similarly to the first embodiment, this configuration can reduce the stress that may act in and near an overlap region of the corresponding wire 20 and the phase difference function-provided polarizing plate 112A, thereby reducing the occurrence of a locally observed uneven color region in the liquid crystal panel ill. Moreover, the wires 20 are each configured to have a projection dimension T1 of 10 μm or less from the rear-side plate surface of the cover glass 113. This dimension leads to a smaller level difference generated by the wires 20 as compared to when the above-mentioned projection dimension T1 would be greater than 10 μm. This configuration reduces the stress that may act on the liquid crystal panel 111 induced by overlapping of the corresponding wires 20 and the phase difference function-provided polarizing plate 112A, thereby reducing the occurrence of an uneven color region. More preferably, the wires 20 each have a projection dimension T1 of 3 μm or less. This dimension leads to a further smaller level difference generated by the wires 20, thereby further reducing the occurrence of an uneven color region. Furthermore, a light transmissive fixation layer 114 interposed between the phase difference function-provided polarizing plate 112A and the cover glass 113 is configured to have a thickness T2 in a range from 200 μm inclusive to 500 μm inclusive. A thickness of the light transmissive fixation layer less than 200 μm would cause the light transmissive fixation layer to fail to fully absorb the stress induced by overlapping of the corresponding wires 20 and the phase difference function-provided polarizing plate 112A. Therefore, such stress may act on the liquid crystal panel 111 to generate an uneven color region. On the contrary, a thickness of the light transmissive fixation layer greater than 500 μm may make it difficult to achieve uniform curing of the light transmissive fixation layer under UV radiation in the manufacturing process. In contrast, the thickness T2 of the light transmissive fixation layer 114 in a range from 200 μm inclusive to 500 μm inclusive enables the light transmissive fixation layer 114 to effectively absorb the stress induced by overlapping of the corresponding wires 20 and the phase difference function-provided polarizing plate 112A. Thus, such stress is less likely to act on the liquid crystal panel 111, and at the same time, the light transmissive fixation layer 114 can be uniformly cured under UV radiation in the manufacturing process, thereby improving productivity. More preferably, the light transmissive fixation layer 114 has a thickness T2 of 300 μm or greater. This dimension enables the light transmissive fixation layer 114 to more effectively absorb the stress induced by overlapping of the corresponding wires 20 and the phase difference function-provided polarizing plate 112A, thereby making it even less likely that such stress may act on the liquid crystal panel 111. Uniformity in curing of the light transmissive fixation layer 114 in the manufacturing process can also be sufficiently ensured.

The liquid crystal panel 111 according to this embodiment includes a pair of substrates 111A and 111B, made of alkali-free glass and each having a linear expansion coefficient of about $38 \cdot 10^{-7}/°$ C. In contrast, the cover glass 113 is made of borosilicate glass or alkali-free glass, and the cover glass 113 made of borosilicate glass has a linear expansion coefficient of about $33 \cdot 10^{-7}/°$ C., and the cover glass 113 made of alkali-free glass has a linear expansion coefficient of about $38 \cdot 10^{-7}/°$ C. Accordingly, the ratio between the linear expansion coefficients of the cover glass 113 made of borosilicate glass and of the pair of substrates 111A and 111B is about 1.15 or about 0.868, and the ratio between the linear expansion coefficients of the cover glass 113 made of alkali-free glass and of the pair of substrates 111A and 111B is 1. This means that the cover glass 113 and the pair of substrates 111A and 111B are configured to have the linear expansion coefficients in a ratio in a range from 0.5 inclusive to 2 inclusive, more preferably, in a range from 0.67 inclusive to 1.5 inclusive. This configuration leads to a small difference in the amount of expansion or shrinkage between the cover glass 113 and the substrates 111A and 111B resulting from a thermal environmental change, thereby making it even less likely that stress may act on the liquid crystal panel 111. In particular, use of alkali-free glass as the material of the cover glass 113, which is the same as the material of the pair of substrates 111A and 111B, causes no difference in the amount of expansion or shrinkage between the cover glass 113 and the substrates 111A and 111B resulting from a thermal environmental change, thereby making it even further less likely that stress may act on the liquid crystal panel 111. This also enables a reduction in cost of procuring the materials for the liquid crystal panel 111 and for the substrates 111A and 111B.

As described above, according to this embodiment, the wires 20 serving as structural elements each have a projection dimension T1 of 10 μm or less from the rear-side plate surface of the cover glass 113. This configuration reduces the stress that may act on the liquid crystal panel 111 induced by overlapping of the corresponding wires 20 serving as structural elements and the phase difference function-provided polarizing plate 112A, thereby further reducing the occurrence of an uneven color region as compared to when the projection dimension T1 would be greater than 10 μm.

In one aspect, the wires 20 serving as structural elements each have a projection dimension T1 of 3 μm or less from the rear-side plate surface of the cover glass 113. This configuration further reduces the stress that may act on the liquid crystal panel 111 induced by overlapping of the corresponding wires 20 serving as structural elements and the phase difference function-provided polarizing plate 112A, thereby further reducing the occurrence of an uneven color region as compared to when the projection dimension T1 would be greater than 3 μm.

The light transmissive fixation layer 114 has a thickness T2 in a range from 200 μm inclusive to 500 μm inclusive. A thickness T2 of the light transmissive fixation layer 114 less than 200 μm would cause the light transmissive fixation layer 114 to fail to fully absorb the stress induced by overlapping of the corresponding wires 20 serving as structural elements and the phase difference function-provided polarizing plate 112A. Thus, such stress may act on the liquid crystal panel 111 to generate an uneven color region. On the contrary, a thickness T2 of the light transmissive fixation layer 114 greater than 500 μm may make it difficult to achieve uniform curing of the light transmissive fixation layer 114 in the manufacturing process. In contrast, the thickness T2 of the light transmissive fixation layer 114 in a range from 200 μm inclusive to 500 μm inclusive enables the light transmissive fixation layer 114 to effectively absorb the stress induced by overlapping of the corresponding wires 20 serving as structural elements and the phase difference function-provided polarizing plate 112A. Thus, such stress is less likely to act on the liquid crystal panel ill, and at the same time, the light transmissive fixation layer 114 can be uniformly cured in the manufacturing process, thereby improving productivity.

In one aspect, the light transmissive fixation layer 114 has a thickness T2 of 300 μm or greater. This dimension enables the light transmissive fixation layer 114 to more effectively absorb the stress induced by overlapping of the corresponding wires 20 serving as structural elements and the phase difference function-provided polarizing plate 112A, thereby making it even less likely that such stress may act on the liquid crystal panel 111.

The liquid crystal panel 111 includes the substrates 111A and 111B, to which the phase difference function-provided polarizing plate 112A is attached. The cover glass 113 and the substrates 111A and 111B have the linear expansion coefficients in a ratio in a range from 0.5 inclusive to 2 inclusive. This configuration leads to a small difference in the amount of expansion or shrinkage between the cover glass 13 and the substrates 111A and 111B resulting from a thermal environmental change, thereby making it even less likely that stress may act on the liquid crystal panel 111 as compare to when the ratio between the linear expansion coefficients would be less than 0.5 or greater than 2.

In one aspect, the liquid crystal panel 111 and the substrates 111A and 111B have a ratio between the linear expansion coefficients thereof in a range from 0.67 inclusive to 1.5 inclusive. This configuration further reduces the difference in the amount of expansion or shrinkage between the cover glass 113 and the substrates 111A and 111B resulting from a thermal environmental change, thereby making it further less likely that stress may act on the liquid crystal panel 111.

In one aspect, the liquid crystal panel 111 and the substrates 111A and 111B are made of the same material. This means that the ratio between the linear expansion coefficients is 1, thereby causing no difference in the amount of expansion or shrinkage between the cover glass 113 and the substrates 111A and 111B resulting from a thermal environmental change. This configuration makes it even further less likely that stress may act on the liquid crystal panel 111. This also enables a reduction in cost of procuring the materials for the liquid crystal panel 111 and for the substrates 111A and 111B.

In addition, the wires 20 arranged on the cover glass 113 serve as structural elements. This configuration enables the wires 20 to be used as structural elements that overlap the phase difference function-provided polarizing plate 112A.

Other Embodiments

The technology described herein is not limited to the embodiments described above and with reference to the drawings. The following embodiments may be included in the technical scope.

(1) The frame-shaped light-shielding element serving as a structural element according to the first embodiment may have a projection dimension of 10 μm or less, preferably of 3 μm or less, from the corresponding plate surface of the cover glass similarly to the wires serving as structural elements according to the second embodiment. Similarly, in a configuration in which the frame-shaped light-shielding element serves as a structural element, the light transmissive fixation layer may have a thickness in a range from 200 μm inclusive (preferably 300 μm inclusive) to 500 μm inclusive. Moreover, in a configuration in which the frame-shaped light-shielding element serves as a structural element, the ratio between the linear expansion coefficients of the cover glass and of the substrates may be in a range from 0.5 inclusive (preferably 0.67 inclusive) to 2 inclusive (preferably 1.5 inclusive). Also in a configuration in which the frame-shaped light-shielding element serves as a structural element, the cover glass and the substrates may be made of the same material.

(2) The specific value of the overlap distance in an overlap region between the frame-shaped light-shielding element or one of the wires, serving as a structural element, and the phase difference function-provided polarizing plate may be modified as appropriate. Similarly, the difference in the overlap distance among multiple overlap regions between the frame-shaped light-shielding element or corresponding one(s) of the wires, each serving as a structural element, and the phase difference function-provided polarizing plate may be modified as appropriate. The specific value of the projection dimension of the frame-shaped light-shielding element or of the wires, each serving as a structural element, from the corresponding plate surface of the cover glass may be modified as appropriate. The specific value of the thickness of the light transmissive fixation layer may be modified as appropriate. The specific values of, and/or the specific ratio between, the linear expansion coefficients of the cover glass and of the substrates may be modified as appropriate.

(3) For example, the TAC films included in the polarizing layer may have a phase difference function, and the phase difference layer may thus be omitted. In addition, the specific configuration of the phase difference function-provided polarizing plate may be modified as appropriate.

(4) In the foregoing embodiments, the frame-shaped light-shielding element and the wires, each serving as a structural element, have been both described as having a light-shielding property, but may also be light transmissive structural elements. For example, a part or all of the wires of the second embodiment may be formed from a transparent electrode film or from a metal film in a mesh configuration to provide a light transmission property.

(5) The light transmissive fixation layer may be made of a photocurable resin material curable by light having a wavelength other than UV wavelengths, such as visible light, or of a thermosetting resin material.

(6) The frame-shaped light-shielding element and the phase difference function-provided polarizing plate may partly overlap each other along the peripheral direction.

(7) The specific arrangement and/or the number of the wires disposed in an outer perimeter portion of the cover glass are not limited to those of the second embodiment, but may be modified as appropriate. For example, multiple wires may be configured to overlap the phase difference function-provided polarizing plate. Alternatively, the wires may be disposed around the entire perimeter of an outer perimeter portion of the cover glass.

(8) The touch panel patterned element may be formed from a metal film in a mesh configuration.

(9) The specific material of the cover glass is not limited to borosilicate glass or alkali-free glass, but may be modified as appropriate. In such case, the protection panel made of a material other than glass (e.g., synthetic resin material) may also be used. The pair of substrates included in the liquid crystal panel may similarly be made of a material other than alkali-free glass. Also in this case, the substrates made of a material other than glass (e.g., synthetic resin material) may be used.

(10) The second embodiment has been described in which the wires are disposed over the cover glass as structural elements. However, the frame-shaped light-shielding element according to the first embodiment may additionally be disposed on the cover glass in addition to the wires.

(11) The second embodiment has been described in terms of a touch panel patterned element based on the self-capacitance principle by way of example. However, the technology described herein may also be applicable to a touch panel patterned element based on the mutual capacitance principle. The shape of the touch electrodes included in the touch panel patterned element is not limited to a rhombus, but may be changed as appropriate to a shape such as a rectangle, a circle, a pentagon, or a higher-order polygon.

(12) The liquid crystal display devices (liquid crystal panels and backlight devices) may each have a planar shape of, for example, a vertically-elongated rectangular shape, a square, an elongated circle, an ellipse, a circle, a trapezoid, or a shape having a partly-curved surface.

(13) The foregoing embodiments have each been described in terms of a liquid crystal display device including a liquid crystal panel. However, the technology described herein may also be applicable to a display device including another type of display panel, such as an organic electroluminescence panel, a microcapsule-type electrophoretic display (EPD) panel, or a micro electro mechanical systems (MEMS) display panel.

The invention claimed is:

1. A display device comprising:
    a display panel configured to display an image;
    a phase difference function-provided polarizing plate attached to the display panel;
    a protection panel disposed to interpose the phase difference function-provided polarizing plate between the display panel and the protection panel;
    a structural element projecting from a plate surface of the protection panel, the plate surface being opposite the phase difference function-provided polarizing plate; and
    a light transmissive fixation layer interposed between and bonding the phase difference function-provided polarizing plate and the protection panel, wherein
    the structural element and the phase difference function-provided polarizing plate overlap each other by an overlap distance of 1.5 mm or less.

2. The display device according to claim 1, wherein the overlap distance of the structural element and the phase difference function-provided polarizing plate is 0.5 mm or less.

3. The display device according to claim 1, wherein
    the display panel, the phase difference function-provided polarizing plate, and the protection panel each have an elongated shape, and
    the structural element overlaps at least two end portions of the phase difference function-provided polarizing plate with respect to an elongated dimension.

4. The display device according to claim 3, wherein the structural element overlaps an outer perimeter portion of the phase difference function-provided polarizing plate along an entire perimeter of the outer perimeter portion.

5. The display device according to claim 1, wherein
    the structural element and the phase difference function-provided polarizing plate overlap each other in a plurality of overlap regions, and
    the plurality of overlap regions have respective overlap distances that differ by 500 μm or less.

6. The display device according to claim 1, wherein the structural element has a projection dimension of 10 μm or less from a plate surface of the protection panel.

7. The display device according to claim 6, wherein the projection dimension of the structural element is 3 μm or less from the plate surface of the protection panel.

8. The display device according to claim 1, wherein the light transmissive fixation layer has a thickness in a range from 200 μm inclusive to 500 μm inclusive.

9. The display device according to claim 8, wherein the light transmissive fixation layer has the thickness of 300 μm or more.

10. The display device according to claim 1, wherein
    the display panel includes a substrate to which the phase difference function-provided polarizing plate is attached, and the protection panel and the substrate have respective linear expansion coefficients in a ratio in a range from 0.5 inclusive to 2 inclusive.

11. The display device according to claim 10, wherein the display panel and the substrate have the respective linear expansion coefficients in a ratio in a range from 0.67 inclusive to 1.5 inclusive.

12. The display device according to claim 10, wherein the display panel and the substrate are made of a same material.

13. The display device according to claim 1, wherein the structural element is disposed around an entire perimeter of an outer perimeter portion of the protection panel to form a frame-shaped light-shielding element having a light-shielding property.

14. The display device according to claim 1, wherein the structural element is a wire arranged on the protection panel.

* * * * *